(12) United States Patent
Chang et al.

(10) Patent No.: US 6,912,227 B1
(45) Date of Patent: Jun. 28, 2005

(54) DEVICE AND METHOD FOR ACQUIRING PHASE OF SPREADING CODE IN CDMA COMMUNICATION SYSTEM

(75) Inventors: Hyon-Sock Chang, Seoul (KR); Yong-Hoon Lee, Taejon-Kwangyokshi (KR); Hyung-Woon Park, Suwon-shi (KR); Sun-Bin Kim, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/286,562

(22) Filed: Apr. 5, 1999

(30) Foreign Application Priority Data

Apr. 4, 1998 (KR) .......................................... 98-11994

(51) Int. Cl.[7] .............................................. H04B 7/216
(52) U.S. Cl. ...................... 370/441; 370/324; 370/350; 370/515; 375/142; 375/149
(58) Field of Search ................................ 370/324, 328, 370/332, 335, 342, 350, 441, 475, 515, 516; 375/206, 208, 209, 366, 367, 368, 343

(56) References Cited

U.S. PATENT DOCUMENTS

| | | | | |
|---|---|---|---|---|
| 4,638,494 | A | * 1/1987 | Kartchner et al. | .......... 375/367 |
| 5,577,025 | A | * 11/1996 | Skinner, deceased et al. | .......... 370/209 |
| 5,642,377 | A | * 6/1997 | Chung et al. | .......... 375/200 |
| 5,644,591 | A | * 7/1997 | Sutton | .......... 375/200 |
| 5,748,687 | A | * 5/1998 | Ozluturk | .......... 375/367 |
| 5,818,868 | A | * 10/1998 | Gaudenzi et al. | .......... 375/206 |
| 5,910,964 | A | * 6/1999 | Sugita | .......... 375/200 |
| 5,940,433 | A | * 8/1999 | Sawahashi et al. | .......... 375/206 |
| 6,049,535 | A | * 4/2000 | Ozukturk et al. | .......... 370/335 |
| 6,069,915 | A | * 5/2000 | Hulbert | .......... 375/150 |
| 6,147,982 | A | * 11/2000 | Sourour et al. | .......... 370/324 |
| 6,389,058 | B1 | * 5/2002 | Lee et al. | .......... 375/141 |

OTHER PUBLICATIONS

A. Polydoros and C.L. Weber, "A Unified Approach to Serial Search Spread–Spectrum Code Acquisition–Part I: General Theory," IEEE Trans. Commun., vol. COM–32, No 5, pp. 542–549, May 1984.

W. Siess and C.L. Weber, "Acquisition of Direct Sequence Signals With Modulation and Jamming," IEEE J. select. Commun., vol. SAC–4, No. 2, pp. 254–272, Mar. 1986.

A. Krzmien, A Jalali and P. Mermelstein, "Rapid Acquisition Algorithms for Synchronization of Bursty Transmission in CDMA Microcellular and Personal Wireless Systems," IEEE J. Select. Areas Commun., vol. 14, No. 3, pp. 570–579, Apr. 1996.

Polydoros and C.L. Weber, :A Unified Approach to Serial Search Spread–spectrum Code Acquisition–Part II: A Matched Filter Receiver, IEEE Trans. Commun., vol. COM–32, No. 5, pp. 550–560, May 1984.

B. Ibrahim and A.H. Aghvami, "Direct Sequence Spread Spectrum Matched Filter Acquisition in Frequency–selective Rayleigh Fading Channels,"IEEE J. Select, Areas Commun., vol. 12, No. 5, pp. 885–890, Jun. 1994.

(Continued)

*Primary Examiner*—Man Phan
(74) *Attorney, Agent, or Firm*—Dilworth & Barrese LLP

(57) ABSTRACT

A code acquisition device securing reliable code acquisition and reducing a time required for a code acquisition procedure. In the device, a sampler samples an input signal, and a searcher continuously searches for a spreading code used for the sampled signal until the phase of the spreading code is acquired. A verifier verifies whether the phase of the spreading code used for the sampled signal is acquired, according to the search result of the searcher. The searcher initializes and restart the verifier whenever the phase of the spreading code is searched.

10 Claims, 4 Drawing Sheets

OTHER PUBLICATIONS

W. Fuxjaeger and R.A. Iltis, "Acquisition of Timing and Doppler–shift in a Direct–sequence Spread –spectrum System,"IEEE Trans. Commun., vol. 42, No. 10, pp. 2870–2880, Oct. 1994.

E. Corazza, "On the MAX/TC Criterion for Code Acquisition and its Application to DS–SSMA Systems." IEEE Trans. Commun., vol. 44, No. 9, pp. 1173–1182, Sep. 1996.

Li, and S. Tantaratana., Optimal and Suboptimal Coherent Acquisition Schemes for PN Sequences with Data Modulation, IEEE Trans. Commun., vol. 43, No. 2/3/4, pp. 554–564, Feb./Mar./Apr. 1995.

Simon, J.K. Omuar, R.A. Scholtz and B.K. Levitt, Spread Spectrum Communications Handbook, pp 757–759, McGraw Hill 2002.

B. Ward and K.P. Yiu, "Acquisition of Pseudonoise Signals by Recursion–aided Sequential Estimation," IEEE Trans. Commun., vol. COM–25, pp. 784–794, Aug. 1977.

C. Kilgus, "Pseudonoise Code Acquisition Using Majority Logic Decoding,"IEEE Trans. Commun., vol. COM–21, pp. 593–600. Jul. 1985.

B. Milstein, J. Gevragiv and P.K. Das, "Rapid Acquisition for Direct Sequence Spread–spectrum Communications Using Parallel SAW Convolvers,"IEEE Trans. Commun., vol. COM–33, No. 7, pp. 593–600. Jul. 1985.

Sourour and S. C. Gupta, Direct–sequence Spread–spectrum Parallel Acquisition in a Fading Mobile Channel, IEEE Trans. Commun., vol. 38, No. 7, pp. 992–998, Jul. 1990.

Jovanovic, V. "On the Distrabution Function of The Spread–spectrum Code Acquisition Time,"IEEE J. Select. Areas Commun., vol. 10, No. 4, pp. 760–769, May 1992.

Cheng, "Performance of a Class of Parallel Spread–spectrum Code Acquisition Schemes in the Presence of Data Modulation," IEEE Trans. Commun., vol. 36, No. 5, pp. 596–604, May 1998.

Chawla and D.V. Sarwate, "Parallel Acquisition of PN Sequences in DS/SS Systems," IEEE Trans. Commun., vol. 42, No. 5, pp. 2155–2164, May 1994.

* cited by examiner

DEVICE AND METHOD FOR ACQUIRING PHASE OF SPREADING CODE IN CDMA COMMUNICATION SYSTEM

CLAIM OF PRIORITY

This application makes reference to, incorporates the same herein, and claims all benefits accruing under 35 U.S.C. §119 from an application entitled DEVICE AND METHOD FOR ACQUIRING PHASE OF SPREADING CODE IN CDMA COMMUNICATION SYSTEM earlier filed in the Korean Industrial Property Office on 4 Apr. 1998, and there duly assigned Serial No. 98-11994.

BACKGROUND OF THE INVENTION

1. Field of the Invention

The present invention relates generally to wireless communication system, and in particular, to a device and method for acquiring a phase of spreading code in a CDMA communication system.

2. Description of the Related Art

In a CDMA communication system, code synchronization between a transmitter and a receiver is very important. That is, the transmitter spreads intended data with a pseudo noise (PN) code and thereafter transmits the spread data. The receiver then calculates a correlation between the received PN code and a locally generated code generated by accurately synchronizing the received PN code with the locally generated code in order to restore the received data.

This synchronization procedure is generally performed in two steps: a code acquisition step and a code tracking step. In the code phase acquisition step, the received PN code is approximately synchronized with a locally generated code in the receiver to within a chip period of the PN code. In the code phase tracking step, the two codes are accurately synchronized with each other after the code acquisition.

In particular, for rapid synchronization, the code phase acquisition step is very important. The following references are listed for their relevance to code acquisition and are incorporated by reference herein:

Reference [1]: A. Polydoros and C. L. Weber, "A Unifiled Approach to Serial Serach Spread-spectrum Code Acquisition-Part I: General Theory," IEEE Trans. Coommun., Vol. COM-32, No. 5, pp. 542–549, May 1984.

Reference [2]: W. Siess and C. L. Weber, "Acquisition of Direct Sequence Signals with Modulation and Jamming," IEEE J. elect. Commun., Vol. SAC-4, No. 2, pp. 254–272, March 1986.

Reference [3]: A. Krzymien, A Jalali and P. Mermelstein, "Rapid Acquisition Algorithms for Synchronization of Bursty Transmission in CDMA Microcellular and Personal Wireless Systems," IEEE J. Select. Areas Commun., Vol. 14, No. 3, pp. 570–579, Apr. 1996.

Reference [4]: Polydoros and C. L. Weber, "A Unified Approach to Serial Search Spread-spectrum Code Acquisition-Part II: A Matched Filter Receiver," IEEE Trans. Commun., Vol. COM-32, No. 5, pp. 550–560, May 1984.

Reference [5]: B. Ibrahim and A. H. Aghvami, "Direct Sequence Spread Spectrum Matched Filter Acquisition in Frequency-selective Rayleigh Fading Channels," IEEE J. Select, Areas Commun., Vol. 12, No. 5, pp. 885–890, June 1994.

Reference [6]: W. Fuxjaeger and R. A. Iltis, "Acquistion of Timing and Doppler-shift in Direct-sequence Spread-spectrum System," IEEE Trans. Commun., Vol. 42, No. 10, pp. 2870–2880, October 1994.

Reference [7]: E. Corazza, "On the MAX/TC Criterion for Code Acquisition and its Application to DS-SSMA Systems," IEEE Trans. Commun., Vol. 44, No. 9, pp. 1173–1182, Sep. 1996.

Reference [8]: Li, and S. Tantaratana, "Optimal and Suboptimal Coherent Acquisition Schemes for PN Sequences with Data Modulation," IEEE Trans. Commun., Vol. 43, No. 2/3/4, pp. 554–564, February/March/April 1995.

Reference [9]: Simon, J. K. Omuar, R. A. Scholtz and B. K. Levitt, Spread Spectrum Communications, Vols. I, II and III, Rockville, Md.: Computer Science Press, 1985.

Reference [10]: B. Ward and K. P. Yiu, "Acquisition of Pseudonoise Signals by Recursion-aided Sequential Estimation," IEEE Trans. Commun., Vol. COM-25, pp. 784–794, August 1977.

Reference [11]: C. Kilgus, "Pseudonoise Code Acquisition Using Majority Logic Decoding," IEEE Trans. Commun., Vol. COM-21, pp. 772–774, June 1973.

Reference [12]: B. Milstein, J. Gevragiv and P. K. Das, "Rapid Acquisition for Direct Sequence Spread-spectrum Communications Using Parallel SAW Convolvers," IEEE Trans. Commun., Vol. COM-33, No. 7, pp. 593–600. July 1985.

Reference [13]: Sourour and S. C. Gupta, "Direct-sequence Spread-spectrum Parallel Acquisition in a Fading Mobile Channel," IEEE Trans. Commun., Vol. 38, No. 7, pp. 992–998, July 1990.

Reference [14]: Sourour and S. C. Gupta, "Direct-sequence Spread-spectrum Parallel Acquisition in Nonselective and Frequency Selective Rician Fading Mobile Channels," IEEE J. Select. Areas Commun., Vol. 10, No. 4, pp. 760–769, May 1992.

Reference [15]: Cheng, "Performance of a Class of Parallel Spread-spectrum Code Acquisition Schemes in the Presence of Data Modulation," IEEE Trans. Commun., Vol. 36, No. 5, pp. 596–604, May 1998.

Reference [16]: Chawla and D. V. Sarwate, "Parallel Acquisition of PN Sequences in DS/SS Systems," IEEE Trans. Commun., Vol. 42, No. 5, pp. 2155–2164, May 1994.

A serial search is a widely recognized code acquisition technique which calculates a correlation between the received code and the local code generated in the receiver and then determines the code phase acquisition according to whether the calculated value is higher than a threshold value or is equal to a maximum value. This technique can be classified as a form of Maximum-Likelihood (ML) search technique in series, as disclosed in the following Reference [9]. Although this technique exhibits superior performance in a multi-user environment as compared with a sequential estimation technique as disclosed in References [10] and [11], it exhibits poor performance as compared with parallel search techniques as disclosed in Reference [8] and [12]–[16]. However, use of the parallel search technique is limited because of its complexity.

In most cases, an actual code acquisition system uses both a searcher and a verifier in order to prevent a false alarm, as disclosed in References [4]–[7] and [12]–[15]. In this case, the searcher and the verifier alternately operate, sharing one correlator. That is, the verification is started, as the acquisition is determined (or declared) by the searcher, the searcher ceases to operate during the verification. The searcher operates again only when a false alarm is raised by the verifier. The procedure is repeated alternating between search and verification, until verification is successfully completed. Through such a procedure, it is possible to reduce a mean acquisition time. The conventional code acquisition system is particularly effective when the searcher has a high probability of false alarm. Such a system having the search and verification functions is referred to as a "two-dwell" system.

In the two-dwell system due to alternation between search and verification, search is not performed during a verification which was initiated in response to a provisional acquisition generated from a previous search operation. The search is resumed only when the false alarm is declared after verification. As such, there is a possibility that the actual code phase offset occurs during the verification period and it will not be detected since the search procedure is on hold during verification. This situation makes it difficult to acquire the code phase. In addition, the time required for code phase acquisition is increased as a result.

SUMMARY OF THE INVENTION

It is, therefore, an object of the present invention to provide a code phase acquisition device and method for improving a performance of a two-dwell system.

It is another object of the present invention to provide a code phase acquisition device and method for securing reliable code phase acquisition and reducing a time required for a code acquisition procedure.

The present invention provides a novel and improved method and device for improving the performance of a two-dwell system for acquiring a spreading code phase. The present invention simultaneously performs search and verification by utilizing both a search correlator and a verifier correlator independently.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 1:
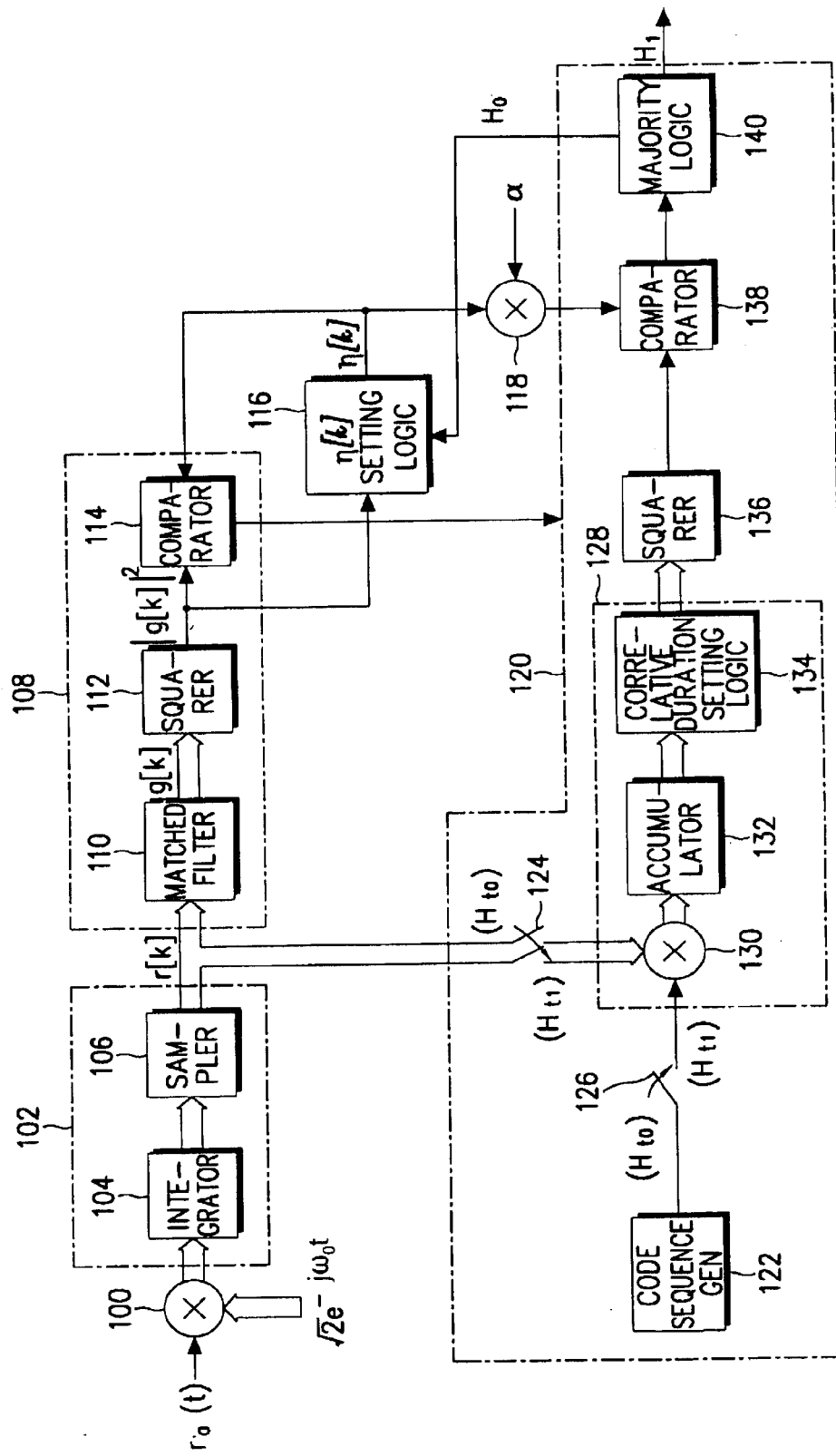
FIG. 1 is a block diagram of a code phase acquisition device according to an embodiment of the present invention.

FIG. 1 is a block diagram of a code phase acquisition device according to an embodiment of the present invention. Unlike the conventional two-dwell system which alternates between search and verification using a single correlator, the code phase acquisition device of FIG. 1 simultaneously performs the steps of search and verification using two independent correlators (i.e., a searcher 108 and a verifier 120).

Referring to FIG. 1, a continuous input signal $\gamma_a(t)$ is first frequency-down-converted to a baseband signal by a local carrier $\overline{2}e^{-jw_0t}$ at a demodulator 100. During demodulation, the signal is divided into an I (In-phase) arm and a Q (Quadrature-phase) arm. In FIG. 1, for convenience, the I and Q arms are not separately illustrated, but simply illustrated by "$\Longrightarrow$". Therefore, the line represented by "$\Longrightarrow$" includes both the I and Q arms.

An output signal of the demodulator 100 is sampled in a time interval $t=k\Delta Tc$, with period $\Delta Tc$ at a sampling part 102 consisting of an integrator 104 and a sampler 106. As a result of the sampling operation, the output signal of the demodulator is thus converted into a discrete signal $\gamma[k]$. Here, a sampling factor is $\Delta=2^{-n}$, where n is a positive number. Further, Tc represents a chip period. The integrator 104 implements an integral equation $$\int_{t-\Delta Tc}^{t} (\ ) d\lambda.$$

The discrete signal, $\gamma[k]$, output from the sampler 102 is simultaneously applied to a matched filter 110 in the searcher 108, and to an active correlator 128 in the verifier 120. Provisional acquisition is determined by the searcher 108.

As is well known in the art, a correlator for code phase acquisition can be implemented by a passive correlator or an active correlator. In FIG. 1, the searcher 108 consisting of the matched filter 110, a squarer 112 and a comparator 114 is an example of a passive correlator implementation which can perform acquisition more rapidly than an active correlator. The matched filter 1110 is used as such a passive correlator.

For the case of an additive white Gaussian noise (AWGN) channel, the discrete signal, $\gamma[k]$, output from the sampling part 102 is given by $$\gamma[k] = \sum_{m=1}^{M} \sqrt{S_m}\, e^{j\theta_m} \int_{(k-1)\Delta Tc}^{k\Delta Tc} d_m(t-\tau_m) C_m(t-\tau_m) dt + n[k] \quad (1)$$

where:
k=1, 2, 3, . . . M represents the number of users,
$S_m$ a signal power of a user m,
$\theta_m$ a phase offset,
$d_m(t)$ user data,
$C_m(t)$ a PN code having a chip cycle L,
$\tau_m$ represents a time delay with respect to a reference time, and
n[k] a Gaussian noise having an average of 0 and a dispersion of $\sigma_n^2 = \Delta TcNo/2$.

In equation (1), if a pilot channel is assumed, then $d(t)=1$ and $C_m(t)=\pm 1$, an output, $g[k]$, of the matched filter 110 for a user m is defined as:

$$g[k] = \sum_{i=0}^{L_p/\Delta-1} \gamma[k-i]C_m[i] \quad (2)$$

where $L_p$ represents a partial correlation length, and $C_m[i]$ can be obtained by sampling $C_m(t)$ in a cycle $\Delta Tc$ as represented by $$C_m[i]=C_m(t)|_{t=i\Delta Tc} \quad (3)$$

The output, $g[k]$, of the matched filter 110 is squared by a squarer 112, so that a correlation value $|g[k]|^2$ is detected and then applied to a comparator 114.

For a more complete understanding of the present invention, a brief description will be provided regarding the code phase acquisition operation of a conventional two-dwell system with specific reference to References [4]–[7] and [12]–[15]. The searcher first compares a correlation value $g[k] 2$ with a threshold value. If the correlation value $|g[k]|^2$ is higher than the threshold value, the search function is terminated and the verification procedure is started. The verifier then replaces a code sequence residing in the matched filter with the same rate of received code sequence by operating a code sequence generator, so as to obtain independent correlation values for a specific code phase offset at every time interval of $L_p/\Delta$ and compare the correlation values with a predetermined threshold value. If the correlation values exceed the threshold value, code phase acquisition is determined and subsequently, code phase tracking is started. Otherwise, the verification function is terminated by inactivating the code sequence generator and the search function is restarted using the code sequence which was originally residing in the matched filter. In this manner, the search and Verification functions are alternately repeated until verification is successfully completed.

In an exemplary embodiment of the present invention, the method of calculating the correlation value $|g[k]|^2$ using the searcher 108 is fundamentally equivalent to that described by the prior art. The present invention is significantly different, however, from the prior art, at a point where the correlation value $|g[k]|^2$ applied to the comparator 114 is compared with a variable threshold value $\eta[k]$ which is variably set by a variable threshold setting logic 116. The variable threshold setting logic 116 normally sets the variable threshold $\eta[k]$ to $\eta_0$ at an initial instant, i.e., at an instant where k=1 or where a false alarm $H_0$ is raised by the verifier 120. Here, $\eta_0$ represents an initial threshold value which was set according to correlation values statistically obtained with respect to the input signal, i.e., the continuous input signal $\gamma_a(t)$. Otherwise, the variable threshold setting logic 116 sets the variable threshold value $\eta[k]$ to max$\{\eta_0, \eta[k-1], |g[k-1]|^2\}$ where the function, max$\{\eta_0,\eta[k-1], |g[k-1]|^2\}$ selects the maximum value from among three candidate values: an initial threshold value $\eta_0$, a previous threshold value $\eta[k-1]$ and a correlation value $|g[k-1]|^2$. The selected maximum value is set as the variable threshold value $\eta[k]$ whenever the searcher 108 performs the search. Accordingly, the variable threshold value $\eta[k]$ is not decreased unless the verifier 120 raises the false alarm $H_0$ and resets the threshold in the search to $\eta_0$. The comparator 114 in the searcher 108 compares the correlation value $g[k]^2$ with the variable threshold value $\eta[k]$, and it generates $H_{t0}$ if $g[k]^2 \eta[k]$ and $H_{t1}$ if $g[k]^2>\eta[k]$ resets and reiterates the verifier; $H_{t0}$ leaves the verifier as it is.

The verifier part 120 consisting of a code sequence generator 122, first and second switches 124 and 126, an active correlator 128, a squarer 136, a comparator 138 and a majority logic 140, is initialized to restart whenever the searcher 108 determines the provisional acquisition $H_{t1}$. The code sequence $c[i]$ is generated starting with $i=L_p/\Delta$ at the same rate as the incoming code sequence. For purposes of clarity, the code sequence residing in the matched filter 110 will be referred to as a first local code sequence and the code sequence generated from the code sequence generator 122 a second local code sequence. The output of the code sequence generator 122 is operably connected to a multiplier 130 in the active correlator 128 via the second switch 126, and the multiplier 130 is connected in turn to an output of the sampler 106 via the first switch 124. The first and second switches 124 and 126 are switched according to an output of the searcher 108: they are in an open state when the comparator 114 in the searcher 108 initially outputs $Ht_0$, and maintain a closed state from an instant where the comparator 114 determines the provisional acquisition $Ht_1$ until the verification is completed.

Therefore, when the searcher 108 determines the provisional acquisition $H_{t1}$, the discrete signal $\gamma[k]$ from the sampler 106 and the second local code sequence from the code sequence generator 122 are applied to the active correlator 128 consisting of the multiplier 130, an accumulator 132 and a correlative duration setting logic 134. The multiplier 130 multiplies an output of the first switch 124 by an output of the second switch 126, the accumulator 132 accumulates an output of the multiplier 130, and the correlative duration setting logic 134 samples an output of the accumulator 132 at multiples of an interval defined by $L_p/\Delta$. As a result, the active correlator 128 calculates a partial correlation between the discrete signal $\gamma[k]$ and the second local code sequence, and outputs a result at regular intervals, (i.e., at intervals of $L_p/\Delta$). The output of the active correlator 128 is squared by the squarer 136 to calculate the magnitude square of correlation value and the calculated correlation value is applied to the comparator 138. The comparator 138 compares the output of the squarer 136 with the threshold value from the multiplier 118. The multiplier 118 connected to an output of the threshold value setting logic 116 multiplies the variable threshold value $\eta[k]$ by a constant $\alpha$, and provides the comparator 138 in the verifier 120 with the multiplied value as a threshold value. Here, the constant $\alpha$ has a value smaller than 1 and is previously set. The comparison result of the comparator 138 is applied to the majority logic 140. The majority logic 140 examines the comparison results, an $\alpha\eta[k]$ code acquisition $H_1$ is declared and code tracking is initiated. Here, A and B are prespecified positive integer and A>B. Otherwise, the majority logic 140 returns a false alarm indication $H_0$. Whenever a false alarm $H_0$ indication is generated it is provided to the variable threshold setting logic 116. Whenever a code acquisition $H_1$ indication is generated it is provided to a code tracking part (not shown) to initiate the code tracking.

Upon an indication of a provisional acquisition, the verifier 120 is initialized by resetting the code sequence generator 122, the active correlator 128, the accumulator 132, the correlative duration setting logic 134 and the majority logic 140. At this time, the accumulator 132 clears its previously stored value, and the majority logic 140 clears the verified value. The code sequence generator 122 generates a second local code sequence.

Figure 2:
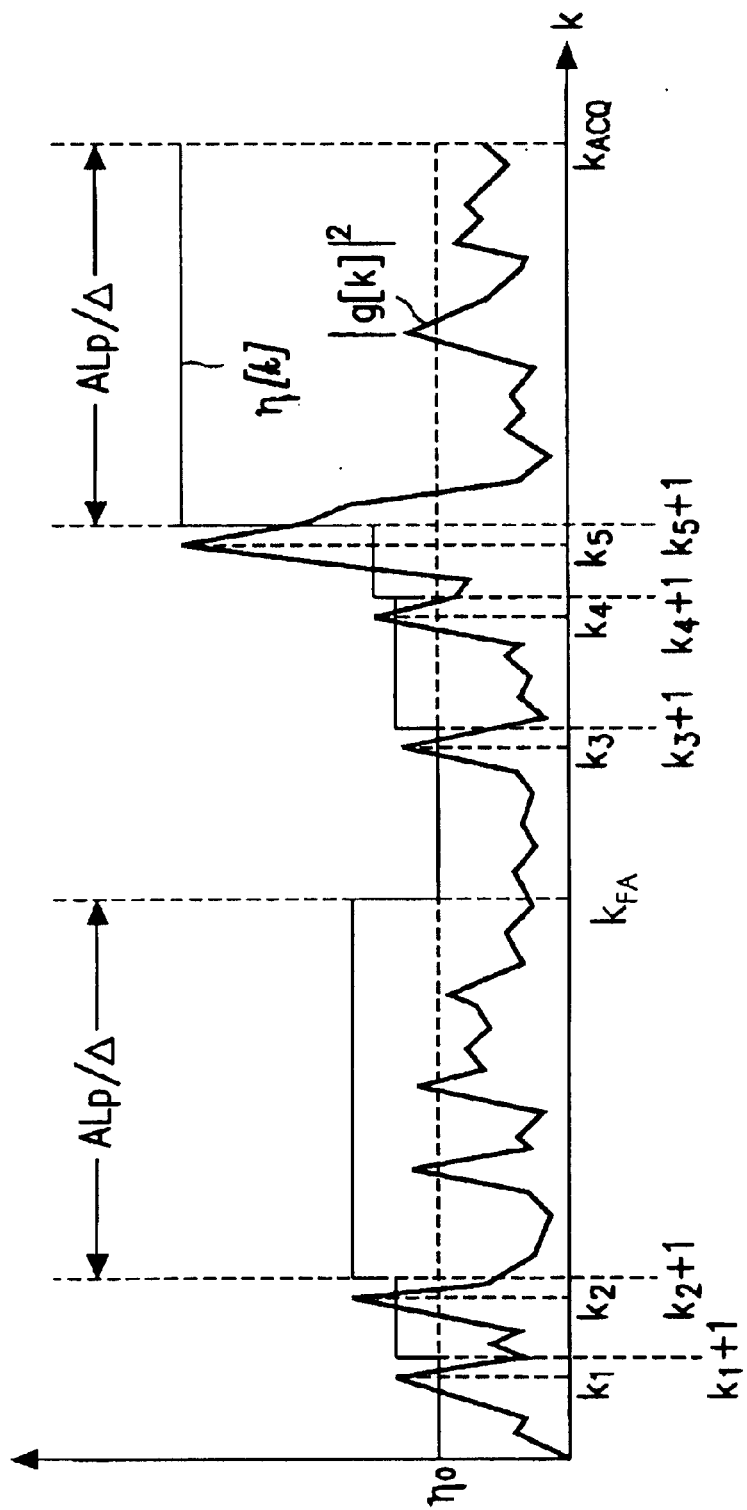
FIG. 2 is a diagram illustrating a change of a variable threshold, $\eta[k]$, and a correlation value, $|g[k]|^2$, of a searcher according to an embodiment of the present invention.

FIG. 2 illustrates a graph of exemplary values of $\eta[k]$, the variable threshold value, and $|g[k]|^2$, the correlation value of the searcher, over time according to an embodiment of the present invention. In FIG. 2, $k_1, k_2, k_3, \ldots$ ($k_1 < k_2 < k_3 \ldots$) represent the instants where the correlation value exceeds the threshold, namely, $|g[k_j]|^2 > \eta[k]$, and $k_1+1, k_2+1, k_3+3, \ldots$ represent sampling instants succeeding the instants $k_1, k_2, k_3, \ldots$, respectively. Here, the time space between each 1 and 2 or k, and $k_1+1$ is $\Delta T_c$ sec. Further, $AL_p/\Delta$ indicates a verification interval of the verifier 120, which is A times $L_p/\Delta$ (where A is a positive number) that represents the number of tests in majority logic. If at least B out of A tests exceed the threshold $\alpha\eta[k]$ an acquisition is declared. In addition, $k_{FA}$ denotes an instant where the false alarm $H_0$ is raised, and $k_{ACQ}$ an instant where a code acquisition $H_1$ is determined.

First, when k=1, the search procedure is started, and when $|g[k_1]|^2 > \eta[k_1]$ at $k=k_1$, the searcher 108 determines that a provisional acquisition $H_{r1}$ has occurred. The verifier 120 is then initialized to start the verification procedure. The variable threshold value $\eta[k_1+1]$ at time $k_1+1$ is increased from initial threshold $\eta_0$ to $g[k_1]^2$. When $k > k_1$, the searcher 108 and the verifier 120 are simultaneously operated. The searcher 108 continues to search for the instants where the correlation value exceeds the threshold value. If the correlation value exceeds the threshold value at the instant $k=k_2$ that is when $|g[k_2]|^2 > [k_1]$, in the case where the verifier 120 has not yet finished a verification procedure associated with the time k=k1, the verifier 120 restarts the verification procedure from the instant $k=k_2+1$, disregarding all the verification results during the interval of $k+1 < k < k_2$. Accordingly, in FIG. 2, the verifier 120 is initialized to restart at the instants $k_1, k_2, k_3, k_4$ and $k_5$. In this manner, the search and verification are simultaneously performed until the verification procedure is completed.

The verification procedure of the present invention is fundamentally identical in operation to the conventional methods disclosed in References [4]–[7]. That is, the active correlator 128 calculates a partial correlation value at multiples of an interval $L_p/\Delta$, and the comparator 138 compares the calculated value with the threshold value $\alpha\eta[k]$, where $\alpha$ is a constant. If the multiple partial correlation values fail to exceed the threshold value $\alpha\eta[k]$, the majority logic 140 generates the false alarm $H_0$. If a false alarm is generated, it will be declared only at the completion of verification $AL_p T_c/\Delta$.

The novel code acquisition method of the present invention can be summarized as follow:

1) The searcher 108 calculates a partial correlation value at every instant to search for the instants $k_1, k_2, k_3, \ldots$ ($k_1 < k_2 < k_3 \ldots$) where $|g[k_j]|^2 > \eta[k_j]$.

2) The verifier 120 starts the verification procedure at the instant $k_1$, and is initialized to restart at the instants $k_j$ where $j \geq 2$. That is, the verification procedure will be re-started each time $|g[k_j]|^2 > \eta[k_j]$ (i.e. at times k1, k2, k3, ...) Here, the variable threshold value $\eta[k]$ is given as described above.

3) Search and verification is performed simultaneously until the verifier 120 determines that code phase acquisition has occurred.

Accordingly, the novel two-dwell system simultaneously performs search and verification by simultaneously using the searcher 108 and the verifier 120. By doing so, it is possible to prevent the search process from missing the detection of a phase of the received code sequence, which may occur while the verification process is being performed since search is not performed during verification in a conventional two-dwell system. Therefore, it is possible to increase a reliability of code phase acquisition and reduce the time required for the code phase acquisition, thereby improving the system performance.

To estimate the system performance according to the present invention, a mean acquisition time is calculated using a computer simulation, and compared with a conventional two-dwell system having a variable threshold value. In the simulation, a Gold code of chip length L=1023 is used, the sampling constant is $\Delta=\frac{1}{2}$, a partial correlation length is $L_p=256$ chips, and the initial threshold value is $\eta_0=0$. For verification, the parameters A and B of the majority logic 140 are set to 4 and 2, respectively: if at least two out of four observations in the verification exceed the threshold value $\Delta\eta[k]$, the code phase acquisition is determined. The time required for a tracking loop to indicate a false lock and the acquisition system to resume the search is set to $25000T_c$ (see Reference [5]). The mean acquisition time is normalized with $LT_c$ and this can be represented by $E\{T_{ACQ}\}/LT_c$.

Figure 3:
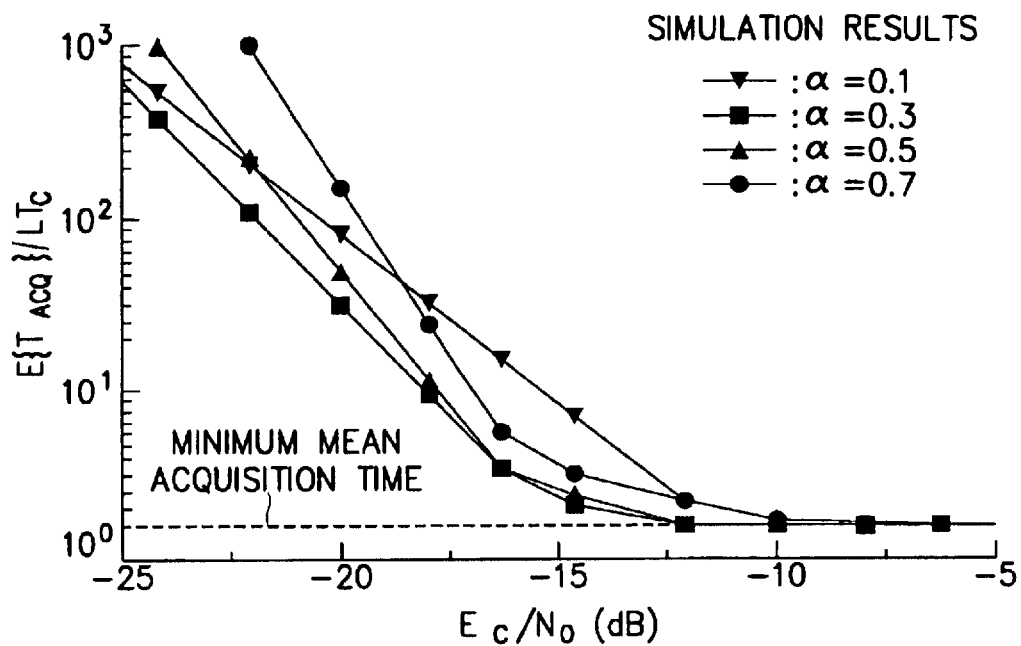
FIG. 3 is a diagram illustrating a normalized mean acquisition time with respect to a signal-to-noise ratio (SNR) per chip, Ec/No, according to the present invention.

In the embodiment, the normalized mean acquisition time $E\{T_{ACQ}\}/LT_c$ was estimated by way of experiment with respect to an SNR per chip, Ec/No, and the parameter $\alpha$. The results are shown in FIG. 3 which illustrate the normalized mean acquisition time with respect to the SNR per chip, Ec/No, according to the present invention. In FIG. 3, when $\alpha=3$, the system exhibits the best performance over the whole region of the SNR per chip, Ec/No. Thus, the simulation was performed with a=3, for a performance comparison with the conventional system.

For the performance comparison, the conventional method disclosed in Reference [5] was compared with the novel system, and a normalized mean acquisition time $E\{T_{ACQ}\}/LT_c$ was calculated by this conventional method. In this conventional method, the threshold value $\eta_\nu$ is given by $$\eta_\nu = \gamma \hat{\sigma}^2 \qquad (4)$$

where $\gamma$ is a constant determined according to the SNR per chip, Ec/No, and $\sigma$ is an estimated dispersion of a disturbance factor. Here, the normalized mean acquisition time was obtained by numerically integrating the computer simulation and an analysis result of Reference [5].

Figure 4:
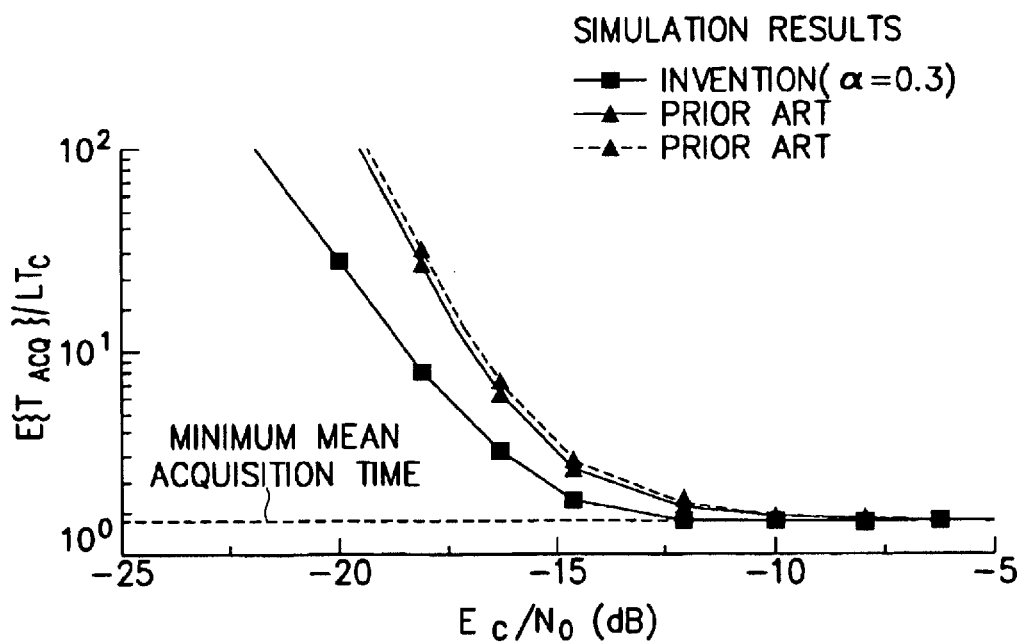
FIG. 4 is a diagram illustrating a mean acquisition time with respect to a signal-to-noise ratio (SNR) per chip, Ec/No, given for a performance comparison between the present invention and the prior art.
Figure 5:
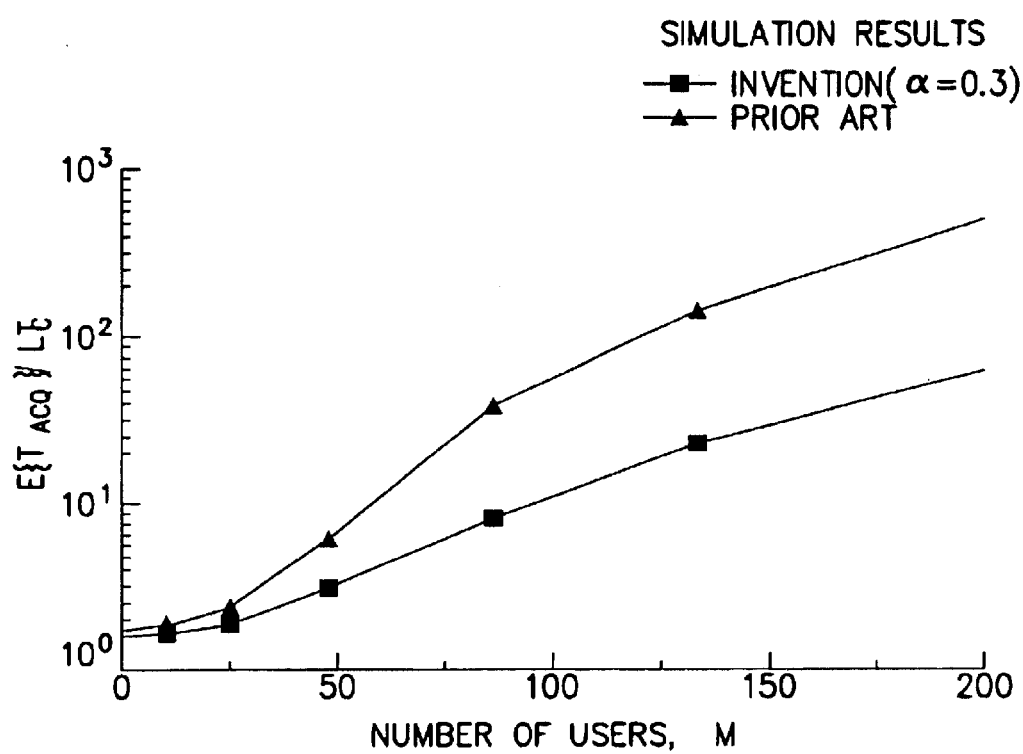
FIG. 5 is a diagram illustrating a mean acquisition time with respect to the number of users, M, given for a performance comparison between the present invention and the prior art.

A performance comparison between these two acquisition methods is shown in FIGS. 4 and 5. FIG. 4 illustrates the mean acquisition time with respect to the SNR per chip, Ec/No, given for a performance comparison between the present invention and the prior art, and FIG. 5 illustrates the mean acquisition time with respect to the number users, M, for both the method of the present invention and the prior art. Referring to FIGS. 4 and 5, it is noted that the simulation result is very similar to the numerical integration result for the conventional variable threshold value acquisition method. Further, it is also noted from FIGS. 4 and 5 that the invention exhibits better performance over the whole region of the SNR per chip, Ec/No, and the number of users, M. In particular, when the SNR per chip, Ec/No, is low and the number of users is high, the performance difference increases. In conclusion, as system parameters become worse, the performance of the novel system is improved.

As described above, the novel two-dwell system can increase system reliability and reduce the time required for the code phase acquisition procedure by simultaneously performing the search and verification, thereby improving the performance.

While the invention has been shown and described with reference to a certain preferred embodiment thereof, it will be understood by those skilled in the art that various changes in form and details may be made therein without departing from the spirit and scope of the invention as defined by the appended claims. For example, although the embodiment uses the matched filter 110, which is a passive correlator, for a rapid acquisition of the searcher 108, an active correlator can be used in place of the matched filter 110. On the contrary, a passive correlator can be used in place of the active correlator 128 in the verifier 120. Further, although the variable threshold value η[k] is multiplied by the constant α using the multiplier 118 and applied to the comparator 138 in the verifier 120 as the threshold value, it is also possible to provide the variable threshold value η[k] to the comparator 138 directly without using the multiplier 118, at the expense of a little performance degradation. In addition, the invention may be equally applied even to a parallel search. Furthermore, when applied to a CDMA communication system, the invention can be used for both a mobile station and a base station.

What is claimed is:

1. A device for acquiring a phase of a spreading code from a received signal in a code division multiple access (CDMA) communication system, comprising:
    a sampler for sampling the received signal wherein said received signal is multiplied by a spreading code;
    a searcher for continuously searching for the phase of the spreading code used for the, sampled signal until it is verified that the phase of the spreading code is acquired; and
    a verifier for verifying whether the spreading code's phase used for the sampled signal is acquired by the searcher, an acquired spreading code phase being subjected to a code phase tracking;
    wherein the searching of said searcher and the verifying of said verifier are concurrently performed.

2. The device as claimed in claim 1, wherein the searcher initializes and restarts the verifier whenever the spreading code's phase is acquired.

3. The device as claimed in claim 1, wherein the searcher comprises:
    a correlator for calculating a correlation between the phase of the spreading code of a sampled signal and the phase of a local spreading code generated by a local code phase generator; and
    a first comparator for comparing the correlation result with a variable threshold value to initialize and restart the verifier whenever the correlation result exceeds the variable threshold value.

4. The device as claimed in claim 3, wherein the verifier comprises:
    a second correlator for calculating a correlation between the phase of spreading code of said sampled signal and the phase of the local spreading code generated by the local code phase generator;
    a second comparator for comparing the correlation with the variable threshold value; and
    a majority logic for determining whether the spreading code is acquired, according to a comparison result of the second comparator.

5. The device as claimed in claim 4, further comprising a variable threshold setting logic for varying the variable threshold value according to search and verification results of the searcher and the verifier.

6. The device as claimed in claim 5, further comprising a multiplier for multiplying the variable threshold value provided from the variable threshold setting logic by a positive constant smaller than one, and providing the multiplied value to the second comparator.

7. The device as claimed in claim 6, wherein the constant is initialized to 0.3.

8. A method for acquiring a phase of a spreading code from a received signal in a CDMA communication system, comprising the steps of:
    sampling an input signal;
    searching for the phase of a spreading code used for the sampled signal;
    verifying whether the phase of the spreading code used for the sampled signal is acquired, while performing the searching step;
    if the phase of the spreading code is newly searched before acquisition of the phase of the spreading code is verified, restarting to verify whether the phase of the spreading code is acquired or not; and
    terminating the procedure upon acquisition of the spreading code's phase and initiating a code phase tracking.

9. A method for acquiring a phase of a spreading code from a received signal in a CDMA communication system, comprising the steps of:
    sampling an input signal;
    comparing a correlation between the sampled signal and a first local code sequence with a variable threshold value to determine an instant where the correlation result exceeds the variable threshold value;
    upon detection of the instant where the correlation exceeds the variable threshold value, comparing a correlation result between the sampled signal and a second local code sequence with the variable threshold value to verify whether the phase of the spreading code is acquired, while performing the previous comparison step;
    if the spreading code is newly searched before acquisition of the phase of the spreading code is verified, restarting to verify whether the phase of the spreading code is acquired or not; and
    terminating the procedure upon acquisition of the phase of the spreading code phase and initiating a code phase tracking.

10. The method as claimed in claim 9, further comprising the steps of:
    setting the variable threshold value to a previously set initial threshold value at an initial search state;
    setting the variable threshold value to a maximum value among (1) the initial threshold value, (2) a particular correlation value between the sampled signal and the first local code sequence, and (3) a previous particular correlation value between a previously sampled signal and the first local code sequence; and
    upon verification that the phase of the spreading code is not acquired, setting the variable threshold value to the initial value.

* * * * *